United States Patent
Syed et al.

(10) Patent No.: US 10,065,491 B1
(45) Date of Patent: Sep. 4, 2018

(54) BATTERY PACK CONNECTOR ASSEMBLY AND CONNECTING METHOD

(71) Applicant: Ford Global Technologies, LLC, Dearborn, MI (US)

(72) Inventors: Shamsuddin A. Syed, Canton, MI (US); Afif Sabbagh, Troy, MI (US); Ihab Grace, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/816,338

(22) Filed: Nov. 17, 2017

(51) Int. Cl.
*B60K 1/04* (2006.01)
*B60L 11/18* (2006.01)

(52) U.S. Cl.
CPC ............ *B60K 1/04* (2013.01); *B60L 11/1877* (2013.01); *B60K 2001/0438* (2013.01)

(58) Field of Classification Search
CPC .. B60L 11/00; B60K 1/00; B60K 1/04; B60K 2001/0405; B60K 2001/0416; B60K 2001/0438; B60K 2001/005; B60K 2001/0472; B60R 16/04; B62D 25/20
See application file for complete search history.

(56) References Cited

U.S. PATENT DOCUMENTS

| | | | |
|---|---|---|---|
| 8,608,230 B2 | 12/2013 | Young et al. | |
| 8,863,878 B2 | 10/2014 | Shirooka et al. | |
| 9,673,433 B1 | 6/2017 | Pullalarevu et al. | |
| 2016/0068195 A1 | 3/2016 | Hentrich et al. | |
| 2016/0236713 A1* | 8/2016 | Sakaguchi | B60K 1/04 |

FOREIGN PATENT DOCUMENTS

| | | |
|---|---|---|
| CN | 106274429 | 1/2017 |
| CN | 206297686 | 7/2017 |
| KR | 19980042815 | 9/1998 |

* cited by examiner

*Primary Examiner* — John D Walters
*Assistant Examiner* — James J Triggs
(74) *Attorney, Agent, or Firm* — Carlson, Gaskey & Olds, P.C.

(57) ABSTRACT

An exemplary connector assembly includes, among other things, a bottom brace at least partially disposed beneath an enclosure of a battery pack to provide an open area vertically between the enclosure and a floor of the bottom brace. A side brace is disposed alongside the enclosure to provide an open area laterally between the enclosure and a floor of the side brace. A bracket connects the bottom and side braces to a vehicle structure. An exemplary battery pack connection method includes, among other things, supporting an enclosure of a battery pack with a bottom brace at least partially disposed beneath the enclosure. The method includes supporting the enclosure with a side brace that is at least partially disposed alongside the enclosure. The method further includes connecting the bottom and side braces to a vehicle structure through a bracket.

19 Claims, 6 Drawing Sheets

BATTERY PACK CONNECTOR ASSEMBLY AND CONNECTING METHOD

TECHNICAL FIELD

This disclosure relates generally to a connector assembly and, more particularly, to a connector assembly that secures a battery pack to an underbody of an electrified vehicle.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively with an internal combustion engine. Electrified vehicles may use electric machines instead of, or in addition to, the internal combustion engine.

Example electrified vehicles include hybrid electric vehicles (HEVs), plug-in hybrid electric vehicles (PHEVs), fuel cell vehicles, and battery electric vehicles (BEVs). A powertrain for an electrified vehicle can include a high-voltage battery pack having battery cells that store electric power for powering the electric machines and other electrical loads of the electrified vehicle.

The battery pack can be secured to an underbody, or another area, of an electrified vehicle. Different electrified vehicles can have different packaging envelopes available to accommodate a battery pack.

SUMMARY

A connector assembly according to an exemplary aspect of the present disclosure includes, among other things, a bottom brace at least partially disposed beneath an enclosure of a battery pack to provide an open area vertically between the enclosure and a floor of the bottom brace. A side brace is disposed alongside the enclosure to provide an open area laterally between the enclosure and a floor of the side brace. A bracket connects the bottom and side braces to a vehicle structure.

In a further non-limiting embodiment of the foregoing assembly, the bottom brace is a tube having a transverse cross-section that is circumferentially continuous.

A further non-limiting embodiment of any of the foregoing assemblies includes the bottom brace as a first bottom brace. The assembly further includes a second bottom brace at least partially disposed beneath the enclosure to provide an open area vertically between the enclosure and the second bottom brace. The first and second bottom braces are laterally spaced a distance from each other.

A further non-limiting embodiment of any of the foregoing assemblies includes a third bottom brace at least partially disposed beneath the enclosure to provide an open area vertically between the enclosure and a floor of the third bottom brace. The third bottom brace extends longitudinally from a position adjacent the first bottom brace to a position adjacent the second bottom brace.

In a further non-limiting embodiment of any of the foregoing assemblies, the first, second, and third bottom braces are each a tube having a transverse cross-section that is circumferentially continuous.

In a further non-limiting embodiment of any of the foregoing assemblies, the side brace is directly connected to a lateral side of the enclosure and, where the side brace is directly connected to the lateral side, the side brace has a transverse cross-section that is circumferentially continuous.

In a further non-limiting embodiment of any of the foregoing assemblies, the side brace is directly connected to a lateral side of the enclosure and, where the side brace is directly connected to the lateral side, the side brace has a transverse cross-section that has a cup-shape and is circumferentially discontinuous.

In a further non-limiting embodiment of any of the foregoing assemblies, the side brace extends from a lateral side of the enclosure to a vertical bottom of the enclosure where the side brace interfaces directly with the bottom brace.

In a further non-limiting embodiment of any of the foregoing assemblies, where the side brace interfaces directly with the bottom brace, the side brace has a transverse cross-section that is circumferentially continuous.

In a further non-limiting embodiment of any of the foregoing assemblies, the side brace is disposed entirely above a bottom of the enclosure such that no portion of the side brace extends vertically below the bottom.

In a further non-limiting embodiment of any of the foregoing assemblies, the bottom and side braces are each directly secured to the enclosure.

In a further non-limiting embodiment of any of the foregoing assemblies, the bracket is directly connected to both the bottom and side braces.

In a further non-limiting embodiment of any of the foregoing assemblies, the bracket is a single, continuous bracket.

In a further non-limiting embodiment of any of the foregoing assemblies, the assembly includes the enclosure of the battery pack. The enclosure is disposed outside of a vehicle and is connected through the bottom brace, side brace, and the bracket to an underbody of the vehicle.

A battery pack connection method according to an exemplary aspect of the present disclosure includes, among other things, supporting an enclosure of a battery pack with a bottom brace at least partially disposed beneath the enclosure. The method includes supporting the enclosure with a side brace that is at least partially disposed alongside the enclosure. The method further includes connecting the bottom and side braces to a vehicle structure through a bracket.

In a further non-limiting embodiment of the foregoing method, a floor of the bottom brace is spaced from the enclosure to provide an open area vertically between the enclosure and the floor of the bottom brace. A floor of the side brace is spaced from the enclosure to provide an open area laterally between the enclosure and the floor of the side brace.

In a further non-limiting embodiment of any of the foregoing methods, the side brace extends continuously from a lateral side of the enclosure to a bottom of the enclosure. The method includes interfacing the side brace directly with the bottom brace beneath the bottom of the enclosure.

In a further non-limiting embodiment of any of the foregoing methods, the bracket is a single, continuous bracket that is directly connected to both the bottom and the side braces.

A further non-limiting embodiment of any of the foregoing methods includes supporting the enclosure with the bottom and side braces such that the enclosure is positioned beneath an underbody of the vehicle.

A further non-limiting embodiment of any of the foregoing methods includes directly connecting the bottom brace to a floor of the enclosure, and the side brace to a lateral side of the enclosure. The method further includes directly connecting the bracket to the bottom brace, the side brace, and the vehicle structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details connector assemblies that secure a battery pack to an area of an electrified vehicle, such as an underbody of the electrified vehicle.

The exemplary connector assemblies provide an open area vertically beneath the battery pack and an open area at a lateral side of the battery pack. The open areas can, among other things, facilitate load absorption during an impact event. The connector assemblies can adapt a battery pack for attachment to various packaging environments.

Figure 1:
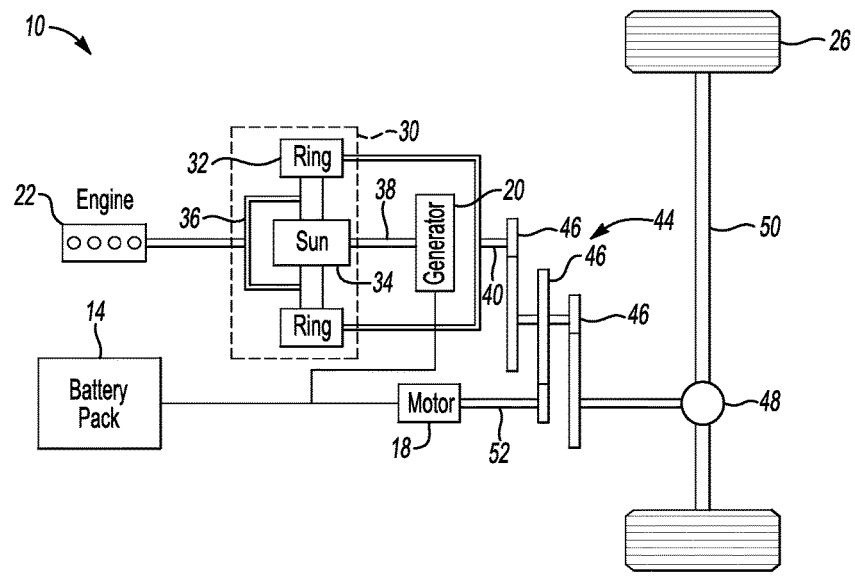
FIG. 1 illustrates a schematic view of a powertrain of an electrified vehicle.

FIG. 1 schematically illustrates a powertrain 10 for an electrified vehicle, which is a hybrid electric vehicle (HEV) in this example. Although depicted as an HEV, it should be understood that the concepts described herein are not limited to HEVs and could extend to other types of electrified vehicle, including, but not limited to, plug-in hybrid electric vehicles (PHEVs), battery electric vehicles (BEVs), fuel cell vehicles, etc.

The powertrain 10 includes a battery pack 14, a motor 18, a generator 20, and an internal combustion engine 22. The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems generate torque to drive one or more sets of vehicle drive wheels 26 of the electrified vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, could be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 can be connected to a shaft 40, which is connected to vehicle drive wheels 26 through a second power transfer unit 44. The second power transfer unit 44 may include a gear set having a plurality of gears 46. Other power transfer units may also be suitable.

The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14.

Figure 2:
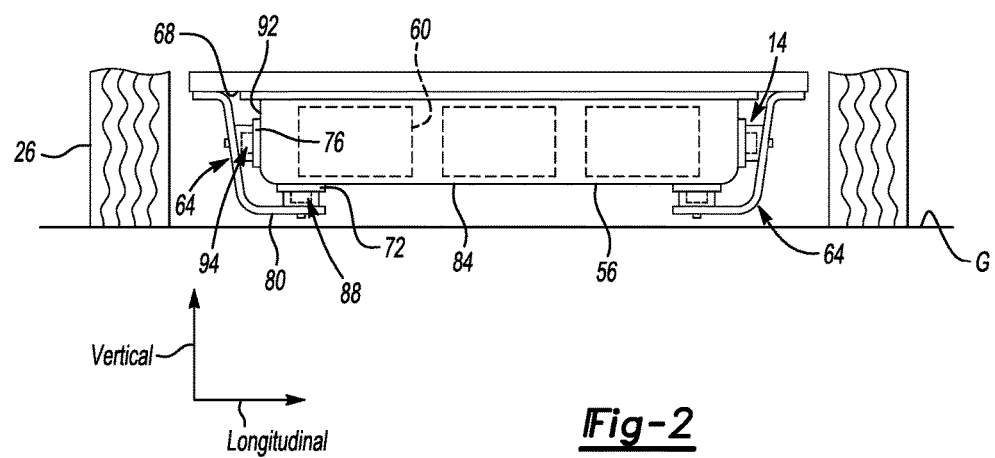
FIG. 2 illustrates a side view of a plurality of connector assemblies securing a battery pack from the powertrain of FIG. 1 to an underbody of a vehicle.

Referring now to FIG. 2, the battery pack 14 can include an enclosure 56 holding a plurality of arrays 60. The enclosure 56 can be, for example, sheet metal, a casting, an extruded enclosure, polymer-based, a metal, a metal alloy, or some other material composition.

Each of the arrays 60 can include a plurality of individual battery cells that can store generated electrical power and can output electrical power to operate the motor 18, the generator 20, or both.

In this example, a plurality of connector assemblies 64 secure the battery pack 14 to an underbody 68 of a vehicle. The battery pack 14 is vertically below the underbody 68. Vertical, for purposes of this disclosure, is with reference to ground G and a normal orientation of the vehicle during operation or when parked. Longitudinal is transverse to vertical.

The enclosure 56 provides an open area that receives the battery arrays 60. When secured to the vehicle, the underbody 68 interfaces with the enclosure 56 to enclose the battery arrays 60 within the open area.

The connector assemblies 64 secure the battery pack 14 to the underbody 68 by connecting the enclosure 56 to the underbody 68. In this example, one of the connector assemblies 64 is disposed on a first lateral side of the battery pack 14, and another of the connector assemblies 64 is disposed on an opposite, second lateral side of the battery pack 14.

Additional connector assemblies 64 could be utilized, as required, to secure the battery pack 14 to the underbody 68. The additional connector assemblies could be disposed along the first or second lateral sides, a side of the battery pack 14 facing a front of the vehicle, a side of the battery pack 14 facing a rear of the vehicle, or in another location depending on a geometry of the battery pack 14.

The exemplary connector assemblies 64 each include a bottom brace 72, a side brace 76, and a bracket 80. The bracket 80 is secured to the bottom brace 72, the side brace 76, and the underbody 68. The bottom brace 72 and the side brace 76 are shown as separate and distinct structures in the embodiment of FIG. 2. In other exemplary embodiments, the bottom brace 72 and the side brace 76 are portions of the same continuous structure.

The bottom brace 72 is at least partially disposed vertically beneath a vertical bottom 84 of the enclosure 56. The bottom brace 72 provides an open area 88 that is vertically beneath the bottom 84 of the enclosure 56.

The side brace 76 is disposed alongside the enclosure 56 and is laterally outside a laterally facing wall 92 of the enclosure 56. The side brace 76 provides an open area 94 that is laterally outside the enclosure 56.

An impact event can direct forces to the vehicle. Due to the open areas 88 and 94, the side brace 76 and the bottom brace 72, can collapse, or otherwise deform, to absorb at least some of the forces resulting from the impact event. Absorbing at least some of the forces can reduce a likelihood for intrusion into the battery pack 14.

In some examples, it may be desirable to install a battery pack having a geometry similar to the battery pack 14 within another vehicle having a cross-car, or longitudinal, width that is less than the vehicle shown in FIG. 2. In such examples, the side braces of the connector assemblies could be eliminated, and the bracket secured directly to a laterally facing wall Eliminating the side braces permit the brackets to move laterally inward toward a median of the vehicle. In other examples, the lateral size of the side braces is reduced rather than eliminating the side braces.

The connection strategies utilizing the connector assemblies 64 can thus facilitate connecting the battery pack 14 to various types of vehicles, even those having different packaging envelopes. Significant changes to the battery pack 14 are not required to incorporate the battery pack 14 within the vehicle of FIG. 2, or another vehicle having a smaller cross-car width. Instead, variations in the cross-car width can be accommodated by changes to the connector assemblies 64.

Similarly, if a vertical height for installing the battery pack is different than the vehicle shown in FIG. 2, the bottom brace 72 can be omitted or redesigned to accommodate the different vertical height, rather than substantially redesigning the battery pack 14 for the other packaging environment.

Accordingly, the connector assembly 64 permits using the battery pack 14 across various vehicle platforms, which can reduce build complexity. In some examples, the connector assembly 64 can be used to retrofit a vehicle to include a battery pack 14.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Figure 3:
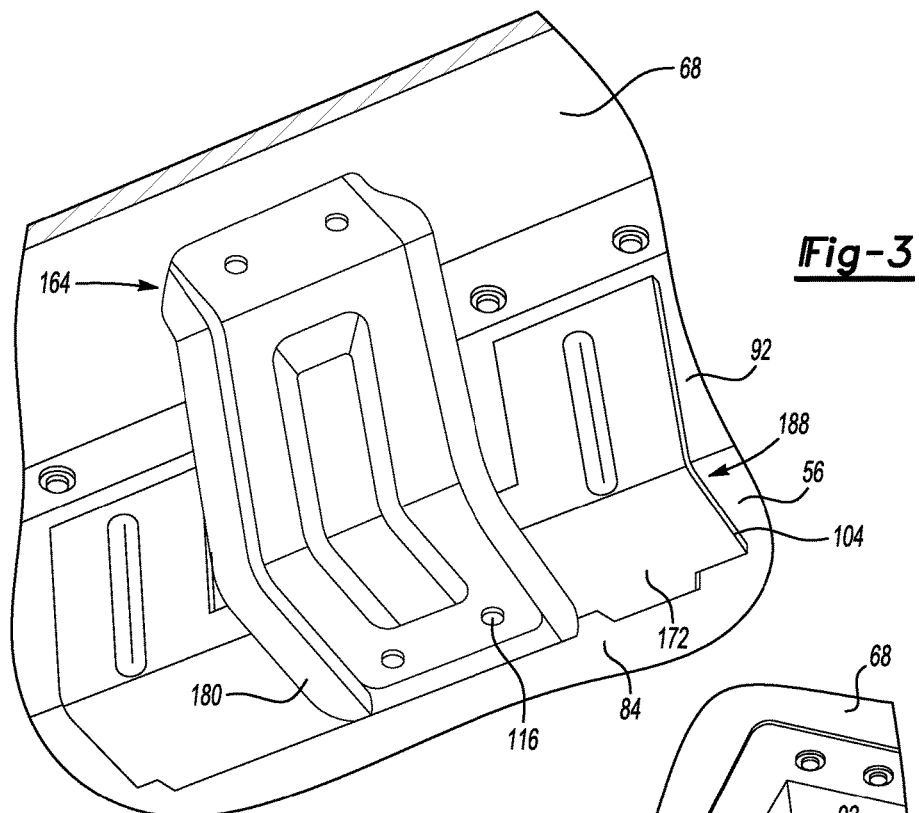
FIG. 3 illustrates a perspective view of a connector assembly securing a battery pack to an underbody of a vehicle according to another exemplary embodiment.
Figure 4:
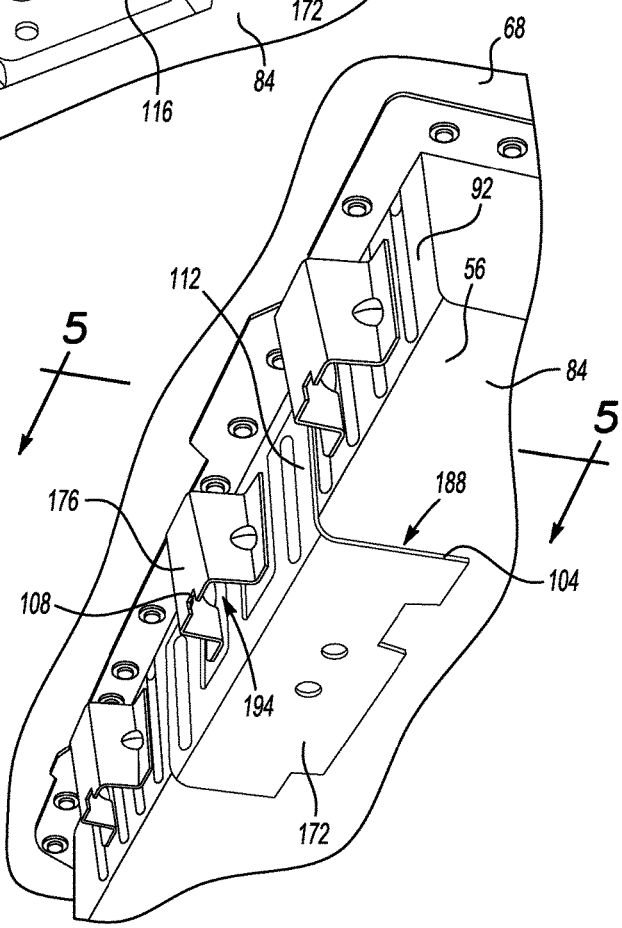
FIG. 4 illustrates a perspective view of the embodiment of FIG. 3 with a bracket removed to reveal a bottom brace and a side brace of the connector assembly.
Figure 5:
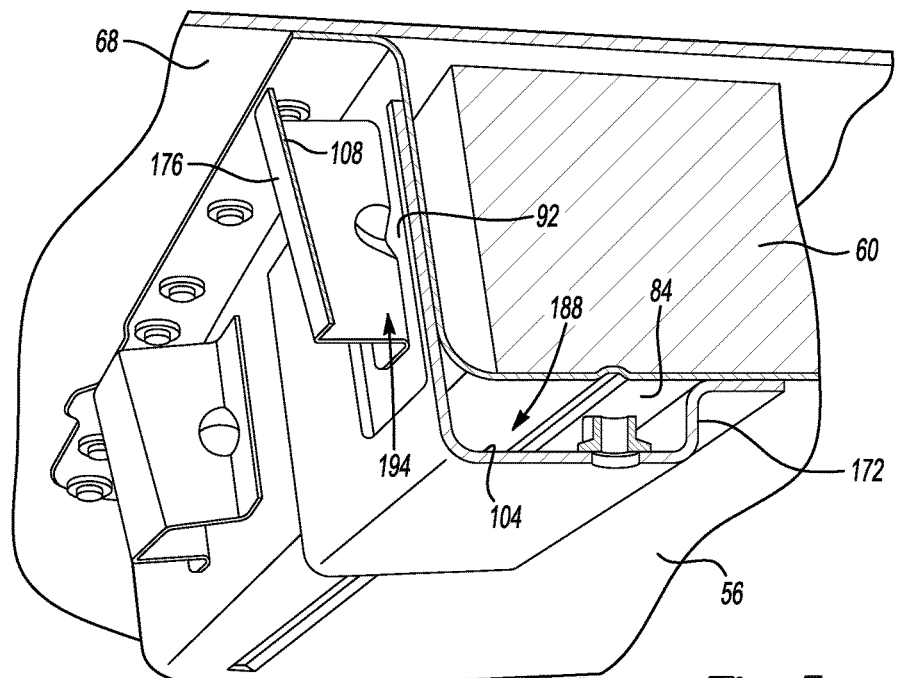
FIG. 5 illustrates a perspective section view taken along Line 5-5 in FIG. 4.

Referring now to FIGS. 3-5, a connector assembly 164 according to another exemplary embodiment of the present disclosure includes a bottom brace 172, a side brace 176, and a bracket 180.

The bottom brace 172 has a floor 104 spaced from the bottom 84 of the enclosure 56. Spacing the floor 104 from the bottom 84 of the enclosure 56 provides an open area 188 vertically between the enclosure 56 and the floor 104.

The side brace 176 includes a floor 108 laterally spaced from the laterally facing wall 92 of the enclosure 56. Spacing the floor 108 of the side brace 176 from the laterally facing wall 92 provides the open area 194 alongside the enclosure 56. Where the side brace 176 attaches to the laterally facing wall 92 of the enclosure 56, the side brace 176 has a transverse cross-section that is circumferentially discontinuous and is generally cup-shaped or C-shaped. Generally, a transverse cross-section is a section taken perpendicular to a longitudinal axis of the side brace 176. The cup-shaped profile can, in some examples, help reduce NVH issues by stiffening the connection between the enclosure 56 and the underbody 68 and be increasing a modal frequency.

In this exemplary embodiment, the bottom brace 172 and the side brace 176 are spot-welded to the enclosure 56 to secure the bottom brace 172 and the side brace 176 to the enclosure 56. In other examples, other types of attachment strategies could be utilized including, for example, attaching the bottom brace 172 and the side brace 176 to the enclosure 56 utilizing mechanical fasteners, or another type of weld.

The bottom brace 172 includes a flange 112 extending alongside, and secured to, the laterally facing wall 92 of the enclosure 56. Securing the flange 112 to the laterally facing wall 92 can be useful if the bottom 84 of the enclosure 56 lacks available areas to suitably weld, or otherwise attach, the bottom brace 172 to the enclosure 56.

The bracket 180 is directly secured to the bottom brace 172, the side brace 176, and the underbody 68 via mechanical fasteners 116. Other attachment strategies could be utilized in other examples including, for example, weldably securing the bracket 180 to the bottom brace 172, the side brace 176, and the underbody 68.

Figure 6:
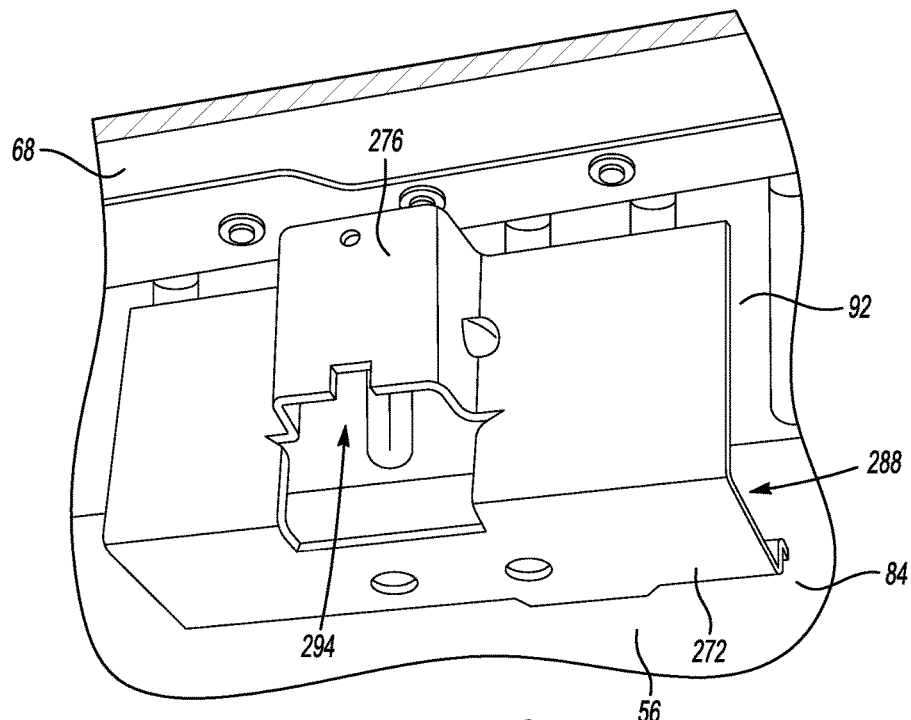
FIG. 6 illustrates a portion of a connector assembly according to another exemplary embodiment where the bottom brace and the side brace are provided by a single, continuous structure.

Referring now to FIG. 6, a connector assembly according to another exemplary embodiment includes a bottom brace 272 and a side brace 276. The bottom brace 272 provides an open area 288 vertically beneath the bottom 84 of the enclosure 56. The side brace 276 provides an open area 294 laterally outside the laterally facing wall 92 of the enclosure 56. A bracket (not shown) can be used to secure the bottom brace 272 and the side brace 276 to the underbody 68.

Notably, in the exemplary embodiment of FIG. 6, the bottom brace 272 and the side brace 276 are portions of the same continuous bracing structure. That is, the bottom brace 272 and the side brace 276 are different areas of a single monolithic structure, and are not separate and distinct braces like in the embodiment of FIGS. 3-5.

Figure 7:
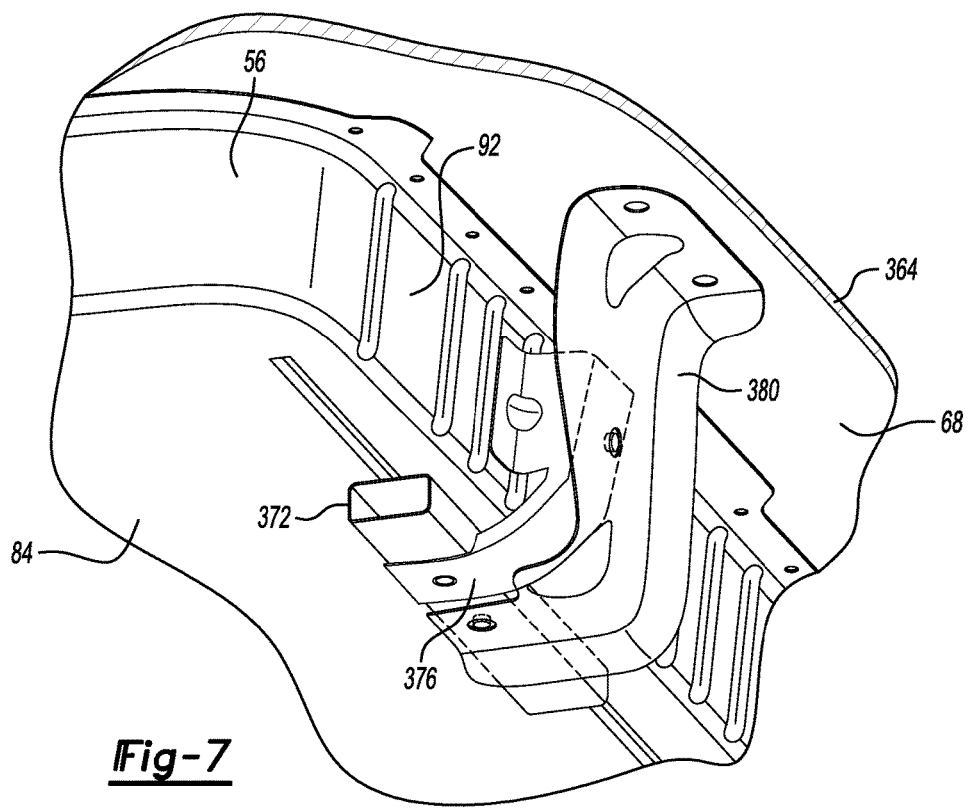
FIG. 7 illustrates a perspective view of a battery pack secured to an underbody of a vehicle via a connector assembly according to yet another exemplary embodiment.
Figure 8:
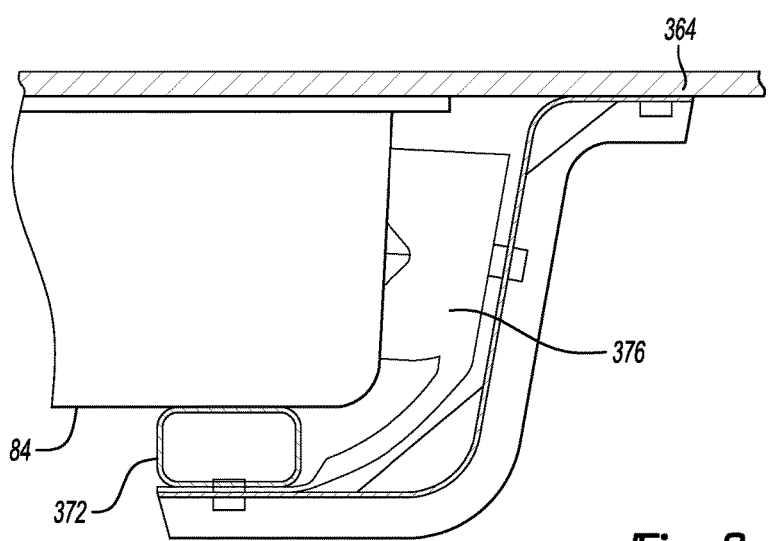
FIG. 8 illustrates an end view of the connector assembly and battery pack of FIG. 7.
Figure 9:
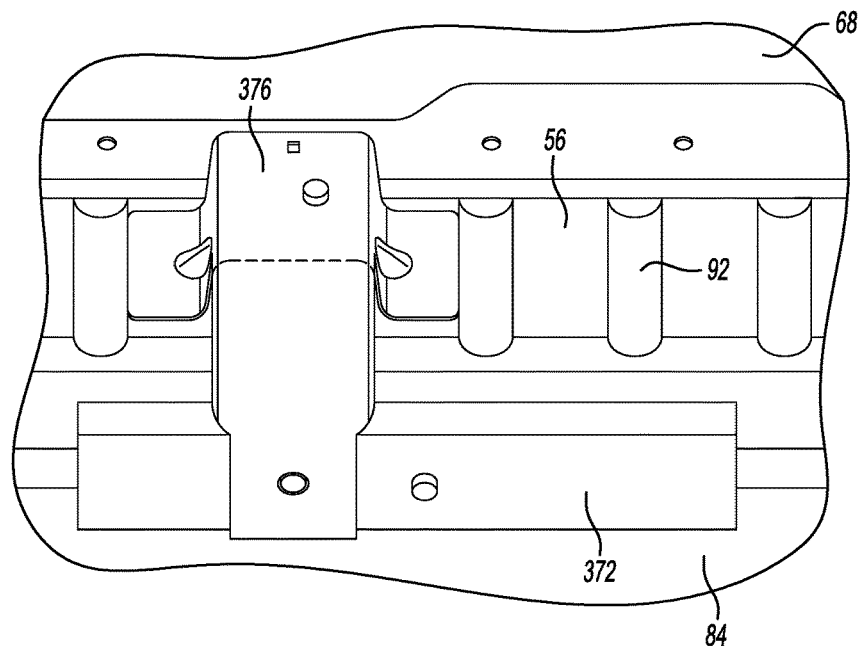
FIG. 9 illustrates a side view of the connector assembly and battery pack of FIG. 7

Referring now to FIGS. 7-9, a connector assembly 364 according to yet another exemplary aspect of the present disclosure includes a bottom brace 372, a side brace 376, and a bracket 380. The exemplary bottom brace 372 is a tube and has a transverse cross-section that is circumferentially continuous. The bottom brace 372 can be an extrusion, a stamping, etc.

Where the side brace 376 attaches to the laterally facing wall 92 of the enclosure 56, the side brace 376 has a transverse cross-section that is circumferentially discontinuous and is generally cup-shaped or C-shaped. Generally, a transverse cross-section is a section taken perpendicular to a longitudinal axis of the side brace 376.

The side brace 376 extends from the laterally facing wall 92 of the enclosure 56 to a position vertically beneath the bottom 84 of the enclosure 56 and, more specifically, to a position where the side brace 376 interfaces directly with the bottom brace 372. Below the bottom 84 of the enclosure 56, the side brace 376 can be mechanically fastened to the bottom brace 372.

Extending the side brace 376 such that the side brace 376 interfaces directly with the bottom brace 372 can, in some examples, enhance load absorption by redirecting at least a portion of a side impact load into the bottom brace 372 and away from the laterally facing wall 92. The bottom brace 372 and the bottom 84 can, in some examples, withstand greater loading than the laterally facing wall 92.

Figure 10:
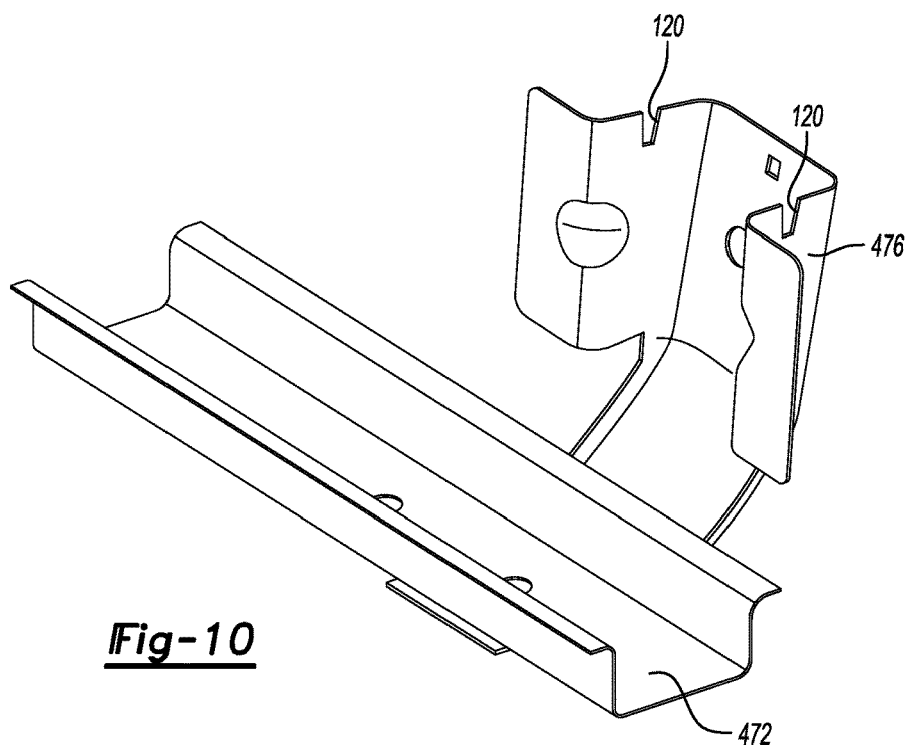
FIG. 10 illustrates a bottom brace and a side brace from a connector assembly according to still another exemplary embodiment.

Referring now to FIG. 10, a connector assembly according to another exemplary embodiment includes a side brace 476 that, like the side brace 376 of FIGS. 7-9, extends from a cup-shaped area to a position beneath a bottom of the enclosure where the side brace 476 interfaces directly with a bottom brace 472. In particular, where the side brace 476 is directly connected to the laterally facing wall 92, the side brace 476 has a transverse cross-section that is circumferentially continuous.

The side brace 476 incorporates a plurality of shear notches 120, which can facilitate desired deformation of the side brace 476 when the vehicle is subjected to an impact load. Although shown in connection with the FIG. 10 embodiment, the shear notches 120 can be incorporated into any of the side braces of this disclosure.

The bottom brace 472 differs from the bottom brace 372 of the FIGS. 7-9 embodiment because, among other things, the bottom brace 472 has a transverse cross-section that is circumferentially discontinuous and, specifically, has a cup-shaped or C-shaped configuration. The bottom brace 472 can be an extrusion, a stamping, etc.

Selecting between the bottom brace 472 with the circumferentially discontinuous cross-section and a bottom brace with a circumferentially continuous cross-section can be influenced by, among other things, packaging and assembly constraints. If, for example, metal inert gas (MIG) welding the bottom brace to a side brace and the enclosure is desired, a bottom brace with circumferentially continuous cross-section can be selected. If, however, spot welding the bottom brace is desired, the circumferentially discontinuous section can be selected. The circumferentially discontinuous cross-section can improve accessibility during spot welding, and thereby facilitate spot welding the bottom brace to the side brace and the enclosure.

Figure 11:
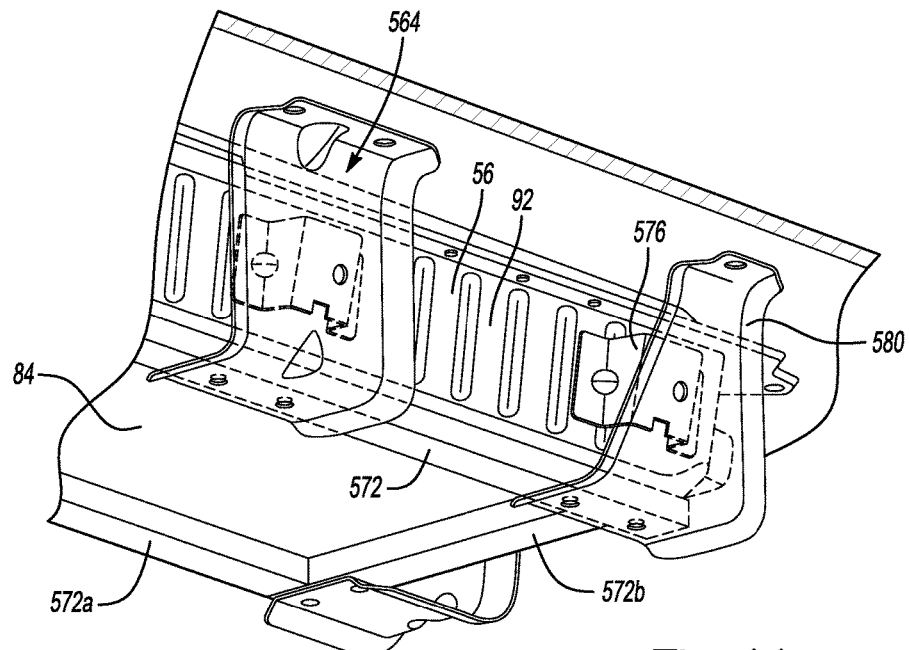
FIG. 11 illustrates a perspective view of a connector assembly according to still another exemplary embodiment.

Referring now to FIG. 11, yet another exemplary connector assembly 564 includes a bottom brace 572, a side brace 576, and a bracket 580. The bottom brace 572 is a tube and has a circumferentially continuous transverse cross-section. The bottom brace 572 is a first bottom brace disposed adjacent the bottom 84 of the enclosure 56.

A second bottom brace 572a is on an opposing lateral side of the bottom 84 from the bottom brace 572. The bottom brace 572a is directly connected to brackets on the opposing lateral side of the enclosure 56 from the brackets 580 shown in FIG. 11.

A third bottom brace 572b extends longitudinally from a position adjacent the bottom brace 572 to a position adjacent the bottom brace 572a. The third bottom brace 572b is generally aligned with one of the brackets 580 and another bracket on an opposing lateral side of the enclosure 56. The third bottom brace 572b can facilitate distributing loads imparted to the bottom brace 572 through the bracket 580.

The second bottom brace 572a, and the third bottom brace 572b, in this example, both are tubes and have a transverse cross-section that is circumferentially continuous. Other exemplary bottom braces could have transverse cross-sections that are circumferentially discontinuous. The first bottom brace 572, the second bottom brace 572a, and the third bottom brace 572b can be extrusions, stampings, etc.

Figure 12:
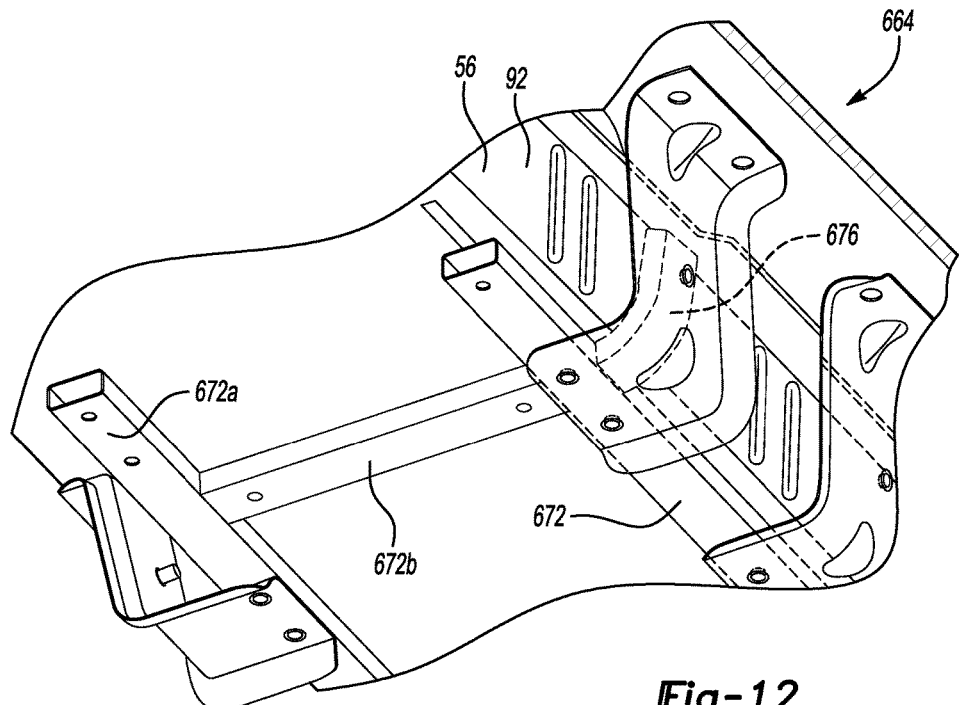
FIG. 12 illustrates a perspective view of a connector assembly according to still another exemplary embodiment.

Referring now to FIG. 12, yet another exemplary connector assembly 664 includes a side brace 676, a first bottom brace 672, a second bottom brace 672a, and a third bottom brace 672b. The side brace 676 extends from the laterally facing wall 92 of the enclosure 56 to interface directly with the first bottom brace 672. The side brace 676 is a tube has a transverse cross-section that is circumferentially continuous. In particular, where the side brace 676 is directly connected to the laterally facing wall 92, the side brace 676 has a transverse cross-section that is circumferentially continuous. Further, where the side brace 676 interfaces with the first bottom brace 672, the side brace 676 has a transverse cross-section that is circumferentially continuous.

Other cross-sections for the side brace 676 could be utilized in other examples. Extending the side brace 676 to the first bottom brace 672 can facilitate directing impact loads into the first bottom brace 672, which are then further distributed via the third bottom brace 672b and the second bottom brace 672a.

Features of the disclosed examples, include connector assemblies that can facilitate absorbing loads. The connector assemblies can be modified to permit a battery pack to be installed in a variety of differently sized packaging envelopes, and to be retrofitted to an existing vehicle. The connector assemblies can, among other things, improve structural performance, provide cost savings, and facilitate serviceability.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:
1. A connector assembly, comprising:
  a bottom brace at least partially disposed beneath an enclosure of a battery pack to provide an open area vertically between the enclosure and a floor of the bottom brace;
  a side brace at least partially disposed alongside the enclosure to provide an open area laterally between the enclosure and a floor of the side brace; and a bracket connecting the bottom and side braces to a vehicle structure, the bottom and side braces each directly secured to the enclosure.

2. The connector assembly of claim 1, wherein the bottom brace is a tube having a transverse cross-section that is circumferentially continuous.

3. The connector assembly of claim 1, wherein the bottom brace is a first bottom brace and further comprising a second bottom brace at least partially disposed beneath the enclosure to provide an open area vertically between the enclosure and the second bottom brace, the first and second bottom braces laterally spaced a distance from each other.

4. The connector assembly of claim 3, further comprising a third bottom brace at least partially disposed beneath the enclosure to provide an open area vertically between the enclosure and a floor of the third bottom brace, the third bottom brace extending longitudinally from a position adjacent the first bottom brace to a position adjacent the second bottom brace.

5. The connector assembly of claim 4, wherein the first, second, and third bottom braces are each a tube having a transverse cross-section that is circumferentially continuous.

6. The connector assembly of claim 1, wherein the side brace is directly connected to a lateral side of the enclosure and, where the side brace is directly connected to the lateral side, the side brace has a transverse cross-section that is circumferentially continuous.

7. The connector assembly of claim 1, wherein the side brace is directly connected to a lateral side of the enclosure and, where the side brace is directly connected to the lateral side, the side brace has a transverse cross-section that has a cup-shape and is circumferentially discontinuous.

8. The connector assembly of claim 1, wherein the side brace extends from a lateral side of the enclosure to a vertical bottom of the enclosure where the side brace interfaces directly with the bottom brace.

9. The connector assembly of claim 8, wherein, where the side brace interfaces directly with the bottom brace, the side brace has a transverse cross-section that is circumferentially continuous.

10. The connector assembly of claim 1, wherein the side brace is disposed entirely above a bottom of the enclosure such that no portion of the side brace extends vertically below the bottom.

11. A connector assembly, comprising:
a bottom brace at least partially disposed beneath an enclosure of a battery pack to provide an open area vertically between the enclosure and a floor of the bottom brace;
a side brace at least partially disposed alongside the enclosure to provide an open area laterally between the enclosure and a floor of the side brace; and
a bracket connecting the bottom and side braces to a vehicle structure, wherein the bracket is directly connected to both the bottom and side braces.

12. The connector assembly of claim 11, wherein the bracket is a single, continuous bracket.

13. The connector assembly of claim 1, further comprising the enclosure of the battery pack disposed outside of a vehicle, the enclosure is connected through the bottom brace, side brace, and the bracket to an underbody of the vehicle.

14. The connector assembly of claim 11, wherein the bottom brace is a tube having a transverse cross-section that is circumferentially continuous.

15. The connector assembly of claim 11, wherein the side brace is directly connected to a lateral side of the enclosure and, where the side brace is directly connected to the lateral side, the side brace has a transverse cross-section that has a cup-shape and is circumferentially discontinuous.

16. The connector assembly of claim 11, wherein the side brace is directly connected to a lateral side of the enclosure and, where the side brace is directly connected to the lateral side, the side brace has a transverse cross-section that has a cup-shape and is circumferentially continuous.

17. A connector assembly, comprising:
a bottom brace providing an open area vertically between an enclosure of a battery pack and a bottom brace floor;
a side brace providing an open area laterally between the enclosure and a side brace floor, the side brace extending to a vertical bottom of the enclosure to interface directly with the bottom brace; and
a bracket connecting the bottom and side braces to a vehicle structure.

18. The connector assembly of claim 13, wherein the bracket is a single, continuous bracket.

19. The connector assembly of claim 13, wherein the bottom brace is a first bottom brace and further comprising a second bottom brace at least partially disposed beneath the enclosure to provide an open area vertically between the enclosure and the second bottom brace, the first and second bottom braces laterally spaced a distance from each other.

* * * * *